United States Patent
Jacoby

(10) Patent No.: US 10,459,815 B2
(45) Date of Patent: *Oct. 29, 2019

(54) METHOD AND SYSTEM FOR PREDICTING STORAGE DEVICE FAILURES

(71) Applicant: Dell Products, LP, Round Rock, TX (US)

(72) Inventor: Robert B. Jacoby, Merrimack, NH (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,234

(22) Filed: Jan. 18, 2019

(65) Prior Publication Data

US 2019/0171541 A1 Jun. 6, 2019

Related U.S. Application Data

(63) Continuation of application No. 14/024,454, filed on Sep. 11, 2013, now Pat. No. 10,223,230.

(51) Int. Cl.
*G06F 11/00* (2006.01)
*G06F 11/30* (2006.01)
*G06F 11/34* (2006.01)

(52) U.S. Cl.
CPC ........ *G06F 11/3034* (2013.01); *G06F 11/008* (2013.01); *G06F 11/3409* (2013.01); *G06F 11/3485* (2013.01)

(58) Field of Classification Search
CPC .............. G06F 11/008; G06F 11/3409; G06F 11/3034; G06F 11/004; G06F 11/3485
See application file for complete search history.

(56) References Cited

U.S. PATENT DOCUMENTS

| | | |
|---|---|---|
| 5,084,819 A | 1/1992 | Dewey et al. |
| 5,828,583 A | 10/1998 | Bush et al. |
| 5,917,724 A | 6/1999 | Brousseau et al. |
| 6,148,335 A | 11/2000 | Haggard et al. |
| 6,189,084 B1 | 2/2001 | Kurisu |

(Continued)

FOREIGN PATENT DOCUMENTS

CN 101414273 B 8/2010

OTHER PUBLICATIONS

Pinheiro, E., et al., "Failure Trends in a Large Disk Drive Population," *Proceedings of the 5th USENIX Conference on File and Storage Technologies (FAST'07)*, (Feb. 2007).

(Continued)

*Primary Examiner* — Jason B Bryan
(74) *Attorney, Agent, or Firm* — Hamilton, Brook, Smith & Reynolds, P.C.

(57) ABSTRACT

The invention pertains to a method and information handling system (IHS) for predicting storage device failures. An embodiment of the method of the present invention begins by obtaining data regarding input and output of the at least one storage device. Next, the obtained data is normalized to determine a duty cycle of the at least one storage device. Finally, using the normalized data, a likelihood of failure of the at least one storage device is determined. In another example embodiment, a failure indicator is associated with the at least one storage device based upon the determined likelihood of failure.

20 Claims, 6 Drawing Sheets

(56) References Cited

U.S. PATENT DOCUMENTS

| | | |
|---|---|---|
| 6,408,406 B1 | 6/2002 | Parris |
| 6,415,189 B1 | 7/2002 | Hajji |
| 6,434,714 B1 | 8/2002 | Lewis et al. |
| 6,467,054 B1 | 10/2002 | Lenny |
| 6,771,440 B2 | 8/2004 | Smith |
| 6,845,306 B2 | 1/2005 | Henry et al. |
| 6,912,676 B1 | 6/2005 | Gusler et al. |
| 7,136,768 B1 | 11/2006 | Shah et al. |
| 7,200,588 B1 | 4/2007 | Srivastava et al. |
| 7,236,911 B1 | 6/2007 | Gough et al. |
| 7,278,057 B2 | 10/2007 | Betancourt et al. |
| 7,302,617 B2 | 11/2007 | Wookey |
| 7,373,559 B2 | 5/2008 | Guha |
| 7,409,582 B2 | 8/2008 | McNeill, Jr. et al. |
| 7,434,097 B2 | 10/2008 | Guha et al. |
| 7,490,073 B1 | 2/2009 | Qureshi et al. |
| 7,539,907 B1 | 5/2009 | Johnsen et al. |
| 7,603,395 B1 | 10/2009 | Bingham et al. |
| 7,653,563 B2 | 1/2010 | Veeningen et al. |
| 7,676,445 B2 | 3/2010 | Fry et al. |
| 7,765,190 B1 | 7/2010 | Bingham et al. |
| 7,865,278 B2 | 1/2011 | Underdal et al. |
| 7,877,645 B2 | 1/2011 | Meyer et al. |
| 7,908,526 B2 | 3/2011 | Guha |
| 8,005,709 B2 | 8/2011 | King et al. |
| 8,015,201 B1 | 9/2011 | Harris |
| 8,073,821 B2 | 12/2011 | Zahayi et al. |
| 8,086,893 B1 | 12/2011 | MacFarland et al. |
| 8,103,463 B2 | 1/2012 | Kalgren et al. |
| 8,136,124 B2 | 3/2012 | Kosche et al. |
| 8,185,784 B2 | 5/2012 | McCombs et al. |
| 8,315,991 B2 | 11/2012 | Mandagere et al. |
| 8,316,263 B1 | 11/2012 | Gough et al. |
| 8,386,889 B1 | 2/2013 | Tang et al. |
| 8,412,600 B2 | 4/2013 | Kim et al. |
| 8,521,546 B2 | 8/2013 | Brown |
| 8,760,780 B1 | 6/2014 | Brooker |
| 8,782,491 B2 | 7/2014 | Resch et al. |
| 8,812,342 B2 | 8/2014 | Barcelo et al. |
| 8,856,927 B1 | 10/2014 | Beloussov et al. |
| 8,862,948 B1 | 10/2014 | Lam |
| 8,880,801 B1 | 11/2014 | Robins et al. |
| 8,904,144 B1 | 12/2014 | Chelur |
| 8,909,990 B2 | 12/2014 | Davis et al. |
| 8,949,672 B1 | 2/2015 | Srihamat et al. |
| 8,949,863 B1 | 2/2015 | Coatney et al. |
| 8,972,799 B1 | 3/2015 | Brooker et al. |
| 9,037,921 B1 | 5/2015 | Brooker et al. |
| 9,084,937 B2 | 7/2015 | Gadher et al. |
| 9,137,110 B1 | 9/2015 | Adogla et al. |
| 9,189,309 B1 | 11/2015 | Ma et al. |
| 9,317,349 B2 | 4/2016 | Jacoby et al. |
| 9,396,200 B2 | 7/2016 | Jacoby et al. |
| 9,436,411 B2 | 9/2016 | Arnold et al. |
| 9,454,423 B2 | 9/2016 | Jacoby et al. |
| 9,720,758 B2 | 8/2017 | Jacoby |
| 10,223,230 B2 | 3/2019 | Jacoby |
| 2002/0052718 A1 | 5/2002 | Little et al. |
| 2002/0087950 A1 | 7/2002 | Brodeur et al. |
| 2003/0112538 A1 | 6/2003 | Smith |
| 2003/0204788 A1 | 10/2003 | Smith |
| 2004/0205403 A1 | 10/2004 | Markow et al. |
| 2004/0260967 A1 | 12/2004 | Guha et al. |
| 2005/0265160 A1 | 12/2005 | Sasaki et al. |
| 2006/0047715 A1 | 3/2006 | Parizeau |
| 2006/0053338 A1 | 3/2006 | Cousins et al. |
| 2006/0075189 A1 | 4/2006 | Hood et al. |
| 2006/0090098 A1 | 4/2006 | Le et al. |
| 2006/0112135 A1 | 5/2006 | Warshawsky |
| 2007/0136389 A1 | 6/2007 | Bergant et al. |
| 2007/0272751 A1 | 11/2007 | Tsurumi |
| 2008/0059292 A1 | 3/2008 | Myers et al. |
| 2008/0209274 A1 | 8/2008 | Nicholson et al. |
| 2009/0161243 A1 | 6/2009 | Sharma et al. |
| 2009/0204852 A1 | 8/2009 | Diggs et al. |
| 2009/0259749 A1 | 10/2009 | Barrett et al. |
| 2009/0279673 A1 | 11/2009 | Maffre et al. |
| 2010/0023867 A1 | 1/2010 | Coldiron et al. |
| 2010/0030586 A1 | 2/2010 | Taylor et al. |
| 2010/0050023 A1 | 2/2010 | Scarpelli et al. |
| 2010/0070683 A1 | 3/2010 | Kelley et al. |
| 2010/0324945 A1 | 12/2010 | Hessing |
| 2011/0106763 A1 | 5/2011 | Madan et al. |
| 2011/0276836 A1 | 11/2011 | Kahana et al. |
| 2012/0066030 A1 | 3/2012 | Limpert |
| 2012/0102543 A1 | 4/2012 | Kohli et al. |
| 2012/0136985 A1 | 5/2012 | Popescu et al. |
| 2012/0179936 A1 | 7/2012 | Masser et al. |
| 2013/0006701 A1 | 1/2013 | Guven et al. |
| 2013/0091499 A1 | 4/2013 | Soundararajan et al. |
| 2013/0185602 A1 | 7/2013 | Jalaldeen et al. |
| 2013/0212425 A1 | 8/2013 | Blaine et al. |
| 2014/0019194 A1 | 1/2014 | Anne |
| 2014/0040897 A1 | 2/2014 | Davis et al. |
| 2014/0108855 A1 | 4/2014 | Gopakumar et al. |
| 2014/0137257 A1 | 5/2014 | Martinez et al. |
| 2014/0164290 A1 | 6/2014 | Salter |
| 2014/0214354 A1 | 7/2014 | Dreifus et al. |
| 2014/0244343 A1 | 8/2014 | Wilson et al. |
| 2014/0244362 A1 | 8/2014 | Chaudhury |
| 2014/0278730 A1 | 9/2014 | Muhart et al. |
| 2014/0310714 A1 | 10/2014 | Chan et al. |
| 2014/0358357 A1 | 12/2014 | Jones et al. |
| 2015/0046756 A1 | 2/2015 | Sreckumaran et al. |
| 2015/0052406 A1 | 2/2015 | Garrett et al. |
| 2015/0067153 A1 | 3/2015 | Bhattacharyya et al. |
| 2015/0074055 A1 | 3/2015 | Jacoby et al. |
| 2015/0074452 A1 | 3/2015 | Tsukahara et al. |
| 2015/0074462 A1 | 3/2015 | Jacoby |
| 2015/0074463 A1 | 3/2015 | Jacoby et al. |
| 2015/0074467 A1 | 3/2015 | Jacoby |
| 2015/0074468 A1 | 3/2015 | Jacoby et al. |
| 2015/0135033 A1 | 5/2015 | Ellis et al. |
| 2015/0277804 A1 | 10/2015 | Arnold et al. |
| 2016/0039291 A1 | 2/2016 | Reese et al. |

OTHER PUBLICATIONS

Anderson, D., et al., "More than an interface—SCSI vs. ATA," *Proceedings of the 2nd Annual Conference on File and Storage Technology (FAST '03)*, pp. 1-13 (Mar. 2003).

Cole, G., "Estimating Drive Reliability in Desktop Computers and Consumer Electronics Systems," *Seagate Technology Paper TP-338. 1*, pp. 1-8, (Nov. 2000).

Yang, J., et al., "A Comprehensive Review of Hard-Disk Drive Reliability," *Proceedings of the Annual Symposium on Reliability and Maintainability*, pp. 403-409 (Jan. 1999).

Hughes, G.F., et al., "Improved Disk-Drive Failure Warnings," *IEEE Transactions on Reliability*, 51(3): 350-357 (Sep. 2002).

Murray, J.F., et al., "Machine Learning Methods for Predicting Failures in Hard Drives: A Multiple-Instance Application," *J. Machine Learning Research*, 6: 783-816 (May 2005).

Wilcoxon, F., "Individual Comparison by Ranking Methods," *Biometrics Bulletin*, 1(6): 80-83 (1945); http://www.jstor.org, pp. 80-83 (Dec. 18, 2006).

Non-Final Office Action for U.S. Appl. No. 14/024,454, entitled, "Method and System for Predicting Storage Device Failures," dated Apr. 10, 2015.

Final Office Action for U.S. Appl. No. 14/024,454, entitled, "Method and System for Predicting Storage Device Failures," dated Sep. 11, 2015.

Non-Final Office Action for U.S. Appl. No. 14/024,454, entitled, "Method and System for Predicting Storage Device Failures," dated Dec. 17, 2015.

Final Office Action for U.S. Appl. No. 14/024,454, entitled, "Method and System for Predicting Storage Device Failures," dated Jun. 13, 2016.

Non-Final Office Action for U.S. Appl. No. 14/024,454, entitled, "Method and System for Predicting Storage Device Failures," dated Nov. 3, 2016.

(56) References Cited

OTHER PUBLICATIONS

Non-Final Office Action for U.S. Appl. No. 14/024,454, entitled, "Method and System for Predicting Storage Device Failures," dated May 16, 2017.
Final Office Action for U.S. Appl. No. 14/024,454, entitled, "Method and System for Predicting Storage Device Failures," dated Dec. 7, 2017.
Non-Final Office Action for U.S. Appl. No. 14/024,454, entitled, "Method and System for Predicting Storage Device Failures," dated Mar. 8, 2018.
Final Office Action for U.S. Appl. No. 14/024,454, entitled, "Method and System for Predicting Storage Device Failures," dated Jul. 23, 2018.
Notice of Allowance for U.S. Appl. No. 14/024,454, entitled, "Method and System for Predicting Storage Device Failures," dated Oct. 24, 2018.

| Member Name | RAID Type | Free Space | Controller Type | Firmware | Model | Size | Type | Random Reads | Sequential Reads | Random Writes | Sequential Writes | Serial Number | Location | Usage | KB data transferred per disk/day | Disk modifier usage | Disk failures | Risk level |
|---|---|---|---|---|---|---|---|---|---|---|---|---|---|---|---|---|---|---|
| A | 50 | 43 | 7 | V6.0.2 | Model: ST1000N M0011 PD04 | 931.5 GB | SATA | 11883000 | 12441000 | 4541000 | 2248000 | | | Normal usage | 1.25E+08 | 1.25E+08 | 0 | MODERATE |
| B | 50 | 43 | 7 | V6.0.2 | Model: ST1000N M0011 PD04 | 931.5 GB | SATA | 11883000 | 12441000 | 4541000 | 2248000 | | | Normal usage | 1.25E+08 | 1.25E+08 | 0 | MODERATE |
| ... | | | | | | | | | | | | | | | | | | |
| Y | 6 | 8 | 10 | V5.2.0 | Model: ST31000 524NS KD03 | 931.5 GB | SATA | 8835000 | 7105000 | 2568000 | 2973000 | | | Normal usage | 49098486 | 2.45E+08 | 7 | LOW+ |
| Z | 6 | 8 | 10 | V5.2.0 | Model: ST31000 524NS KD03 | 931.5 GB | SATA | 8835000 | 7105000 | 2568000 | 2973000 | | | Normal usage | 49098486 | 2.45E+08 | 7 | LOW+ |

550

551 →

552 → Risk level

FIG. 5

METHOD AND SYSTEM FOR PREDICTING STORAGE DEVICE FAILURES

RELATED APPLICATION

This application is a continuation of U.S. application Ser. No. 14/024,454, filed on Sep. 11, 2013. The entire teachings of the above application are incorporated herein by reference.

BACKGROUND OF THE INVENTION

The increased use of technology and computers has generated a corresponding increase in digital data. This ever-increasing digital data requires a corresponding ever-increasing amount of storage space.

The need for storage space for digital data has been fueled through many changes in society. For example, home computer users increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further reliance upon the integrity and required accessibility of the digital data. While storage device reliability has increased, these devices have not become infallible.

SUMMARY OF THE INVENTION

Thus, an efficient and reliable method of predicting storage device failures is needed. The present invention is directed to a method and corresponding apparatus for predicting storage device failures. An embodiment of the method of the present invention begins by obtaining data regarding input and output of at least one storage device. Next, the obtained data is normalized in order to determine the duty cycle of the at least one storage device for which the data was obtained. Finally, the likelihood of failure of the at least one storage device is determined using the normalized data.

According to a further embodiment of the present invention, the obtained data may comprise device configuration information. In such an embodiment, the obtained data may comprise at least one of: a number of reads, a number of writes, a size of one or more reads, a size of one or more writes, a number of redundant array of independent disk (RAID) sets, a total number of disks, a number of disks per RAID set, and a full partial/stripe ratio. In yet another embodiment of the present invention, the method further comprises associating a high, medium, or low failure indicator with the at least one storage device, wherein the failure indicator is based upon the determined likelihood of failure. Yet further still, another embodiment of the method further comprises obtaining pre-established failure data which is based upon one or more hardware characteristics of the at least one storage device and modifying the determined likelihood of failure of the at least one storage device using the obtained pre-established failure data.

In an embodiment of the present invention wherein pre-established failure data is obtained, an embodiment of the method may comprise associating a high, medium, or low failure indicator with the at least one storage device which is based upon the likelihood of failure determined using the normalized data. Further, such an embodiment may further comprise modifying the associated failure indicator of the at least one storage device to be one of high-plus, medium-plus or low-plus using the pre-established failure data. Yet further still, according to an embodiment of the method of the invention, the pre-established failure data comprises at least one of: storage device size, storage device speed, storage device class, and RAID type.

Another embodiment of the method of the present invention is directed to predicting double fault of storage devices. In such an embodiment, the storage device comprises two or more storage devices and the method, for each of the two or more storage devices, obtains respective data regarding input and output of the storage device. Next, the obtained data is normalized to determine a respective duty cycle for each of the two or more storage devices. Finally, a respective likelihood of failure of each storage device is determined using the normalized data. An embodiment of the present invention, wherein the storage device comprises two or more storage devices may further comprise obtaining respective pre-established failure data of each storage device, wherein the pre-established failure data is based upon one or more hardware characteristics of each storage device. In yet another embodiment wherein the storage device further comprises two or more storage devices, the method further comprises modifying the respective determination of the likelihood of failure of the storage device using the obtained respective pre-established failure data.

Yet further still, embodiments of the present invention that are directed to a storage device comprising two or more storage devices may be configured to carryout any of the embodiments of the invention described herein with respect to a storage device comprising at least one storage device.

A further embodiment of the present invention is directed to an information handling system (IHS). An embodiment of the IHS comprises a data module configured to obtain data regarding input and output of the at least one storage device, a normalizing module communicatively coupled to the data module and configured to normalize the obtained data to determine duty cycle of the at least one storage device, and an assessment module configured to determine a likelihood of failure of the at least one storage device using the normalized data.

According to an embodiment of the IHS, the obtained data comprises device configuration information and at least one of: a number of reads, a number of writes, a size of one or more reads, a size of one or more writes, a number of RAID sets, a total number of disks, a number of disks per RAID set, and a full/partial stripe ratio.

In an alternative embodiment of the IHS, the assessment module is configured to associate a failure indicator with the at least one storage device based upon the determined likelihood of failure. According to an embodiment of the IHS, the failure indicator may be a high, medium, or low failure indicator. In yet another embodiment of the IHS, the data module is configured to obtain pre-established failure data based upon one or more hardware characteristics of the at least one storage device. In such an embodiment, the assessment module is further configured to modify the determined likelihood of failure of the at least one storage device using the obtained pre-established failure data.

Yet further still, in an embodiment of the IHS wherein the assessment module is further configured to associate a high, medium, or low failure indicator with the at least one storage device based upon the likelihood of failure determined using the normalized data, the assessment module may be further configured to modify the associated failure indicator of the at least one storage device to be one of high-plus, medium-plus, or low-plus using the pre-established failure data.

According to an embodiment of the IHS, the pre-established failure data based upon one or more hardware characteristics of the at least one storage device comprises at least one of: storage device size, storage device speed, storage device class, and RAID type.

Similarly to embodiments of methods of the present invention, an embodiment of the IHS is directed to determining the likelihood of double fault of storage devices. In such an embodiment of the IHS the at least one storage device comprises two or more storage devices. Further, for each of the two or more storage devices, the data module is configured to obtain respective data regarding input and output of each storage device, the normalizing module is configured to normalize the obtained data to determine a respective duty cycle for each storage device, and the assessment module is configured to determine a respective likelihood of failure of each storage device using the normalized data.

In an alternative embodiment of the IHS wherein the storage device comprises two or more storage devices, the data module may be further configured to obtain respective pre-established failure data of each storage device. According to such an embodiment of the IHS, the pre-established failure data is based upon one or more hardware characteristics of the storage device. According to an embodiment of the invention wherein the IHS is configured for each of two or more storage devices, to determine a respective likelihood of failure of each storage device, the assessment module may be further configured to modify the respective determination of the likelihood of failure of each storage device using the obtained respective pre-established failure data.

An alternative embodiment of the invention is directed to a non-transitory computer readable medium having stored thereon a sequence of instructions which, when loaded and executed by a processor coupled to an apparatus, cause the apparatus to: obtain data regarding input and output of the at least one storage device, normalize the obtained data to determine duty cycle of the at least one storage device, and determine a likelihood of failure of the at least one storage device using the normalized data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 depicts a database entry of data that may be used in an embodiment of the present invention.

DETAILED DESCRIPTION OF THE INVENTION

A description of example embodiments of the invention follows.

While solutions exist for predicting storage device failures, the existing solutions are inadequate. Typical solutions for predicting storage device failures rely upon internal storage device metrics. For example, storage device failure prediction methods exist that rely upon Self-Monitoring Analysis and Reporting (SMART) data. These solutions however are typically inaccurate. Thus, embodiments of the present invention are directed to methods and corresponding systems that use statistical prediction based upon input and output patterns, duty cycles, and/or device characteristics to predict the failure of storage devices.

Figure 1:
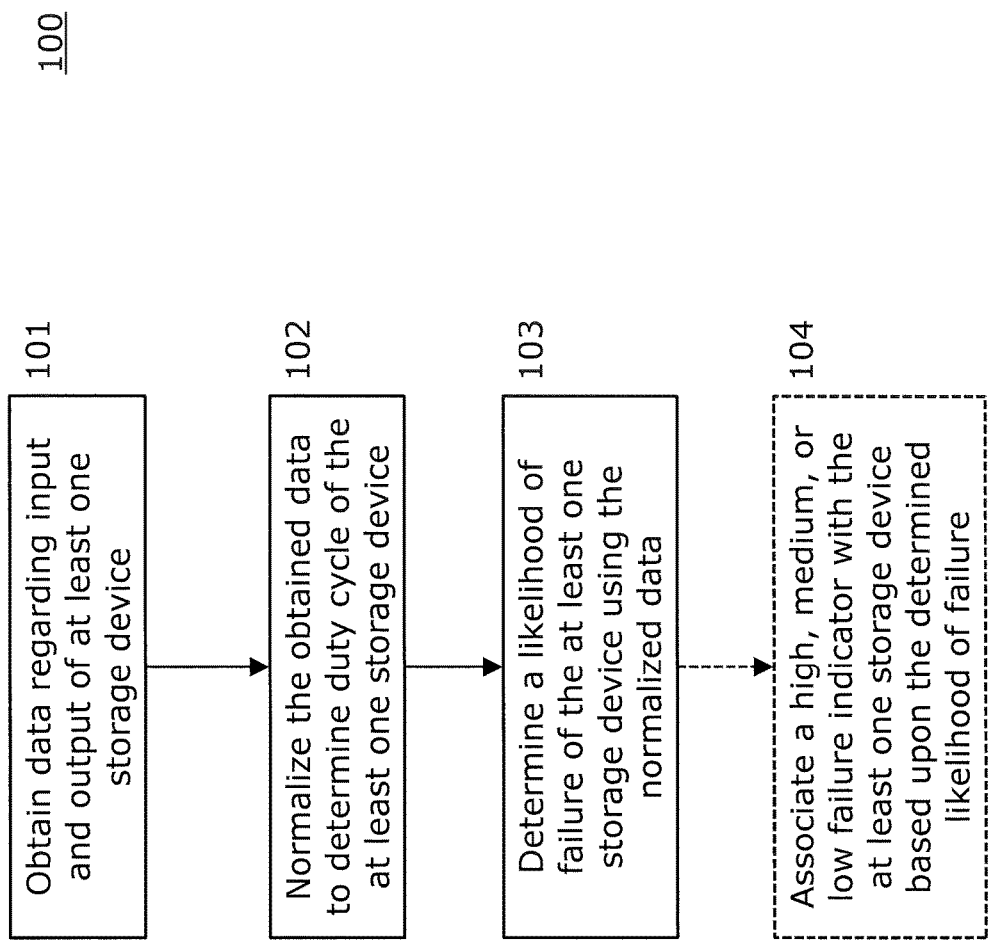
FIG. 1 is a flowchart of a method of predicting storage device failures according to an embodiment of the invention.

FIG. 1 is a flow diagram of a method 100 of predicting storage device failures according to the principles of the present invention. The method 100 begins by obtaining data regarding input and output of at least one storage device (101). Next, the obtained data is normalized to determine duty cycle of the at least one storage device (102). Finally, a likelihood of failure of the at least one storage device is determined using the normalized data (103).

The method 100 begins by obtaining data regarding input and output of the at least one storage device (101). The data may be obtained from any source that is known in the art. For example, in an embodiment wherein the method 100 is being carried out on a computer system, the data may be obtained from any point that is communicatively coupled to the computer system. For example, the data may be communicated to an apparatus performing the method 100 via a local area network (LAN) and/or a wide area network (WAN). Yet further still, in an example embodiment of the method 100, wherein the method 100 is being carried out on a computing device, the data may be obtained by loading the data directly on the computing device. Alternatively, the data may be obtained from any storage device that is known in the art that is communicatively coupled to the computing device carrying out the method 100. In an alternative embodiment of the method 100 that is operating in a computer network environment, such as a server/client environment, the data regarding input and output of the storage device may be obtained by the server running the method 100 from a communicatively coupled client computer. Further, in such an environment, an embodiment may be carried out on a client computer and the data may be obtained from a communicatively coupled client, server, or any combination thereof.

The obtained data may comprise any data regarding input and output of the storage device as is known in the art. For example, in an embodiment of the method 100, the obtained data comprises device configuration information. In such an embodiment, the obtained data comprises at least one of: a number of redundant array of independent disk (RAID) sets, a total number of disks, a number of disks per RAID set, and a full/partial stripe ratio. In another example embodiment, the obtained data may comprise information regarding the amount of data written to a stripe in a RAID set. Further still, in an alternative embodiment of the method 100, the obtained data comprises at least one of: a number of reads, a number of writes, and a size of one or more reads, a size of one or more writes. According to an example embodiment, the obtained data may further include information related to the interface type of the storage device. Example embodiments of the present invention may utilize any interface types as are known in the art, including SATA (Serial Advance Technology Attachment), PATA (Parallel ATA), SCSI (Small Computer System Interface), and/or SAS (Serial Attached SCSI) interfaces. Further, an embodiment of the present invention may obtain any combination of data regarding input and output as described herein.

In an example embodiment of the present invention wherein the storage device is an EqualLogic™ storage device, the obtained data may further comprise any one of a total number of reads and writes, the size of each transaction, RAID modifiers, mirror modifiers, and/or internal page movement. In such an embodiment, accounting for factors such as internal page movement and mirror modifiers allows the duty cycle to be determined accurately. For example, when RAID technology is used a write transaction from the operating system may be duplicated to diverse storage media within the RAID set to ensure that the data is accessible in the event of a device failure. Such an implementation may allow for read transactions to retrieve data from any of the storage devices that were previously written to. Other types of storage devices that may be utilized in performing an embodiment of the present invention may use any performance enhancing procedure as is known in the art. For example, some storage devices store data as pages, and further move this data (the pages) to different and often faster subsystems of the storage device based upon the frequency with which those pieces of data are accessed. In an example embodiment of the present invention, wherein the storage device stores data in pages, this internal page movement will be accounted for when determining the duty cycle of the storage device. In another example embodiment, the obtained data may be the data as described hereinbelow in relation to FIGS. 5 and/or 6.

While example embodiments of the method 100 are described hereinabove as using a number of read or writes, this number may be any number which may be derived from input and output data of the storage device. For example, an average number of reads and writes may be used. Further still, all of the aforementioned obtained data may be pre, or post processed, such that the obtained data is not pure, raw, input and output data, but may be, for example, an average. Yet further still, embodiments of the method 100 may obtain any combination of any of the data regarding input and output of the storage device and device configuration information as described herein or as known in the art.

The method 100 begins by obtaining data regarding input and output of at least one storage device (101). The method 100 may obtain data regarding input and output of any number of storage devices. Further, at step 101 data regarding any type of storage device as is known in the art may be obtained. For example, the data may pertain to a magnetic hard disk or a solid state drive.

After obtaining data (101), the method 100 next normalizes the obtained data to determine duty cycle of the at least one storage device (102). As mentioned hereinabove, the obtained data may comprise a number of reads, a number of writes, a size of one or more reads, a size of one or more writes, a number of RAID sets, a total number of disks per RAID set, and a full/partial stripe ratio. This obtained data or any combination thereof may be used to determine the duty cycle of the at least one storage device. The duty cycle may correspond to the total number of reads and writes for the storage device.

According to an embodiment of the method 100, the duty cycle determined in step 102 is a weighted duty cycle. For example, in an embodiment of the invention, wherein the storage device is a RAID 6 storage device, for every write to the storage device committed from an operating system there are actually six writes to the storage device. By normalizing the obtained data in step 102 the method 100 may determine the duty cycle of each storage device in the RAID 6 storage device.

The method 100 may conclude by determining a likelihood of failure of the at least one storage device (103), using the normalized data determined in step 102. The determination of the likelihood of failure calculated in step 103 may be based upon the workload of the at least one storage device. Example embodiments of the method 100 may further comprise providing output to a user. According to an embodiment of the method 100, output may be provided at each step, 101-103, of the method 100. For example, after the likelihood of failure of the at least one storage device is determined (103), the likelihood of failure may be reported to a user of the storage device or a user executing the method 100. Further, in an example embodiment, any output from the method 100 may be in the form of an email report, electronic notification, or any form of communication as is known in the art.

In an alternative embodiment of the method 100, the method 100 further comprises associating a high, medium, or low failure indicator with the at least one storage device based upon the determined likelihood of failure (104). The high, medium, or low failure indicator may be the words, high, medium, or low, or any other failure indicator as is known in the art. For example, colors may be used to indicate failure wherein, red, yellow, and green are equated with high, medium, and low respectively. Similarly to embodiments of the method 100 described hereinabove, the failure indicators determined in step 104 of the method 100 may be communicated and/or outputted from the method 100. Further, according to an alternative embodiment of the method 100, the failure indicators may be any indication of the likelihood of failure as is known in the art and are not limited to being that of high, medium, and low. For example, in an embodiment of the method 100, a numerical scale is used to indicate the likelihood of failure.

Figure 2:
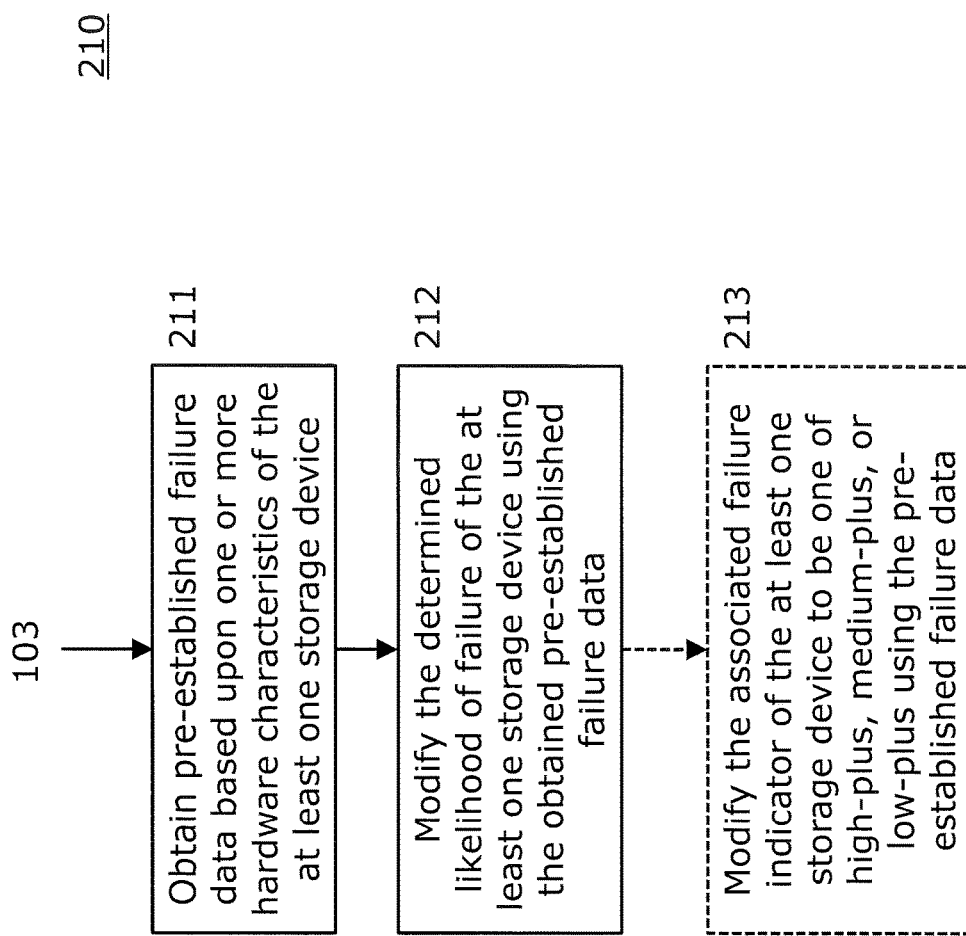
FIG. 2 is a flowchart of a method of predicting storage device failures using pre-established failure data according to an embodiment of the invention.

FIG. 2 illustrates a method 210 of predicting storage device failures according to an embodiment of the present invention. The method 210 may be a continuation of the method 100 described hereinabove in relation to FIG. 1 and may proceed from step 103 and/or step 104 of the method 100. Further, the method 210 may receive as input, the likelihood of failure determined in step 103 and/or the failure indicator determined in step 104 of the method 100.

The method 210 begins by obtaining pre-established failure data which is based upon one or more hardware characteristics of the least one storage device (211). Next, the likelihood of failure of the at least one storage device is modified using the obtained pre-established failure data (212).

While the method 210 is described as a continuation of the method 100, i.e., the method 210 comprises modifying the determined likelihood of failure determined in step 103 of the method 100, according to an alternative embodiment of the present invention, the methods 100 and 210 may be carried out together, such that the initial determination of the likelihood of failure considers both the pre-established failure data and normalized data regarding input and output. In such an embodiment, the method begins by obtaining data regarding input and output of the at least one storage device and pre-established failure data based upon one or more hardware characteristics of the at least one storage device. Next, the data regarding input and output of the at least one storage device is normalized to determine a duty cycle of the at least one storage device. Finally, likelihood of failure is determined using both the normalized data and the pre-established failure data of the at least one storage device. In this manner, rather than modifying the determined likelihood of failure as in step 212 of the method 210, the original determination of the likelihood of failure accounts for the pre-established failure data.

In an alternative embodiment of the method 210, the method further comprises modifying the high, medium, or low failure indicator associated with the at least one storage device using the pre-established failure data (213). In such an embodiment, the failure indicator is modified to be one of high-plus, medium-plus or low-plus. Further, in another example embodiment of the present invention, the original step of associating a failure indicator with the determined likelihood of failure, as in step 104 of the method 100, may account for pre-established failure data, and thus, the originally associated failure indicator may be one of high-plus, medium-plus, or low-plus. Further, the modified failure indicator may be a modified version of any failure indicator described herein.

According to an embodiment of the method 210, the pre-established failure data that is based upon one or more hardware characteristics of the least one storage device may comprise storage device size, storage device speed, storage device class, and RAID type. For example, a storage device class may refer to whether the storage device is a solid state device (SSD) or a traditional spinning magnetic storage device. Further, according to an example embodiment of the present invention, the pre-established failure data may be a known threshold at which storage devices degrade. For example, storage devices, depending on any number of factors, including drive quality, may degrade when, as a non-limiting example, 500 gigabytes to 10 terabytes are written to the device in a day. Thus, in an example embodiment of the present invention, the failure indicator is modified in step 213 of the method 210 when more than a given threshold of data is written to the at least one storage device.

An alternative embodiment of the present invention is directed to a method for predicting the failure of multiple storage devices. In such an embodiment of the invention, the likelihood of failure may be predicted for any number of storage devices. For example, an embodiment of the present invention is directed to determining the likelihood of failure of two disks in a RAID storage device. Such an embodiment may be especially helpful where the RAID system cannot provide data back-up if there are two or more device failures. In such an example embodiment, an embodiment of the present invention may be used to ensure that a storage device is replaced if it is determined that there is a high likelihood of failure for two or more disks in the RAID set.

In an embodiment of the invention directed to predicting storage device failures for multiple storage devices, the method begins by obtaining respective data regarding input and output of the storage devices. Next, the obtained data is normalized to determine the respective duty cycle of each storage device. Finally, a respective likelihood of failure of the storage devices is determined using the normalized data.

While an embodiment of the present invention comprises obtaining respective data regarding input and output of the storage devices, an alternative embodiment does not require obtaining respective input and output data. For example, wherein the storage device is a RAID storage device and thus comprises multiple independent disks, input and output data for the entire RAID storage device may be obtained and then processed using the known RAID configuration to determine the respective input and output characteristics of the independent disks that comprise the RAID storage device.

Similar to the embodiments of the methods described hereinabove, a method of the present invention, wherein the storage device comprises two or more storage devices may comprise obtaining respective pre-established failure data of the storage device which is based upon one or more hardware characteristics of the storage device. Further, another example embodiment of the present invention comprises modifying the respective determination of the likelihood of failure for the two or more storage devices using the obtained pre-established failure data. Yet further still, as described hereinabove, an embodiment of the present invention may begin by obtaining both input and output data of two or more storage devices and pre-established failure data of the two or more storage devices. Next, the obtained input and output data is normalized and finally, a respective likelihood of failure of the two or more storage devices is determined using both the normalized data and the pre-established failure data.

Figure 3:
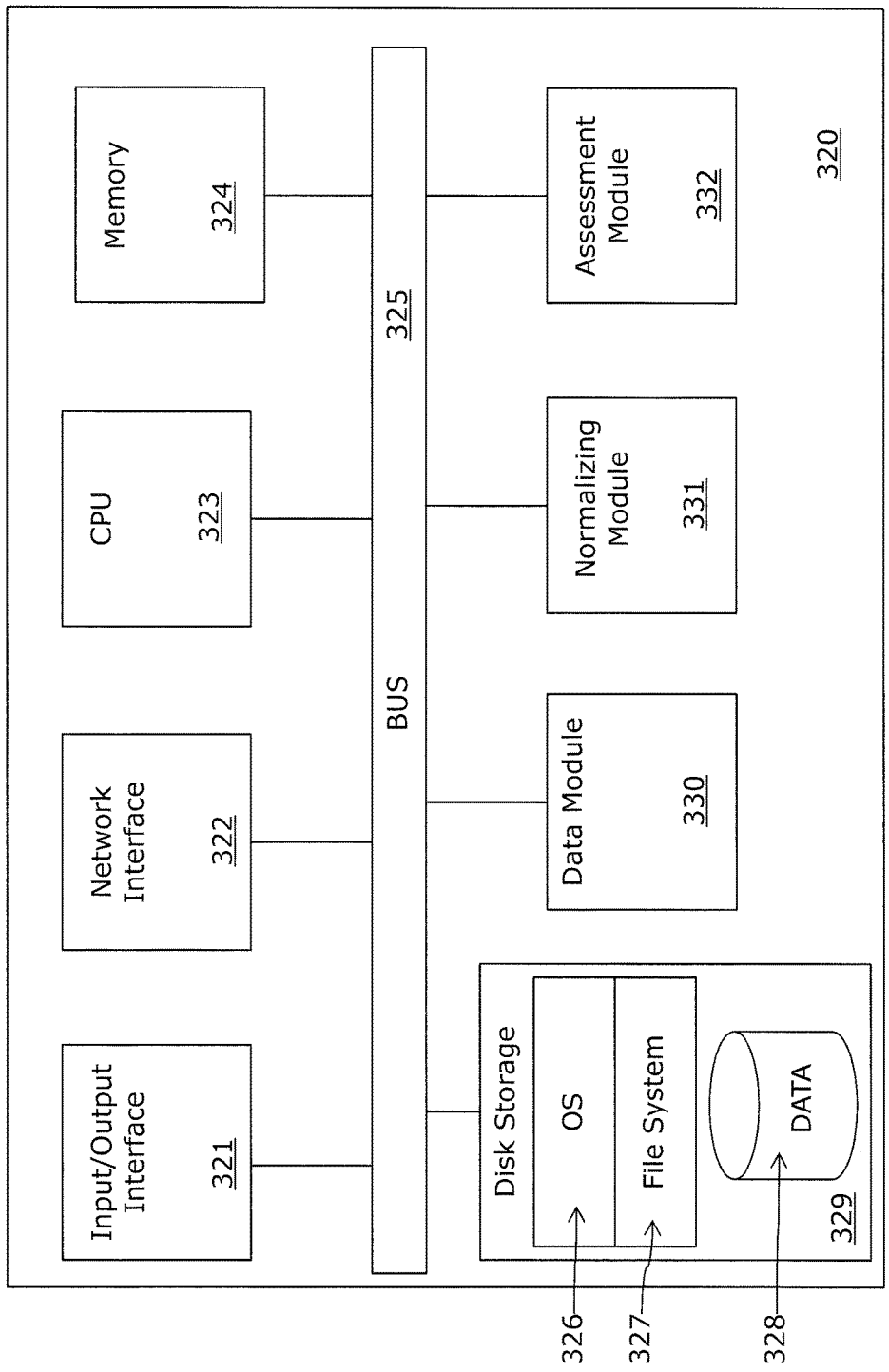
FIG. 3 is a simplified block diagram of an Information Handling System (IHS) configured to predict storage device failures.

FIG. 3 is a high level block diagram of an information handling system (IHS) 320 that is configured to predict storage device failures. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS 320. Further connected to the bus 325 is a network interface 322 for connecting the IHS 320 to the various networks that are known in the art. Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

The IHS 320 further comprises a data module 330. According to an embodiment of the IHS 320, the data module 330 is configured to obtain data regarding input and output of at least one storage device. The data obtained by the data module 330 may be any data as described herein. The data module 330 may obtain the data from any communicatively coupled source. For example, the data module 330 may obtain the data from the storage device 329 or via the input/output interface 321 or network interface 322.

Communicatively coupled to the data module 330 is the normalizing module 331. The normalizing module 331 is configured to normalize the data obtained by the data module 330 to determine duty cycle of the at least one storage device. The IHS 320 further comprises an assessment module 332. The assessment module 332 is configured to determine a likelihood of failure of the storage device using the normalized data.

The IHS 320 and its various components and modules work in conjunction to predict storage device failures. According to an example operation of the IHS 320, the data module 330 obtains data regarding input and output of at least one storage device, such as a storage device communicatively coupled to the IHS 320 via the network interface 322. Next, the normalizing module 331 determines duty cycle of the at least one storage device. In such an embodiment, the data module 331 normalizes the obtained data to determine the duty cycle of the storage device. Finally, the assessment module 332 determines the likelihood of failure of the at least one storage device using the normalized data.

While the various components of the IHS 320 are illustrated in FIG. 3, embodiments of the IHS 320 are not so limited, and as it would be known in the art, components and modules of the IHS 320 may be connected in a variety of ways, including embodiments wherein one or more components are remotely located. It should be understood by a person of ordinary skill in the art that the IHS 320 may be implemented in various forms. The respective components and modules of the IHS 320 may be combined in any manner that is known in the art and may be implemented in any combination of hardware and software. For example, the above-described components and modules may be executable instructions in memory 324 or OS 326 operated on by CPU 323. Further, the IHS 320 and its various components and modules may be configured to operate in a manner corresponding to the above described methods 100 and 210 described herein above in relation to FIGS. 1 and 2 and its various embodiments.

Further, the IHS 320 and its various modules may be configured to perform any of the various methods described hereinabove. For example, in an embodiment of the IHS 320, the assessment module 332 is configured to associate a high, medium, or low failure indicator with the at least one storage device based upon the determined likelihood of failure. In another example embodiment of the IHS 320, the data module 330 is configured to obtain pre-established failure data based upon one or more hardware characteristic of the at least one storage device. In such an embodiment, the assessment module 332 is further configured to modify the determined likelihood of failure of the at least one storage device using the obtained pre-established failure data. In yet another embodiment of the IHS 320, the assessment module 332 is configured to modify the associated failure indicator of the at least one storage device to be one of high-plus, medium-plus, or low-plus using the pre-established failure data.

Further embodiments of the IHS 320 may be configured to predict storage device failures for two or more storage devices. In such an embodiment, the data module 330 is configured to obtain respective data regarding input and output of each storage device, the normalizing module 331 is configured to normalize the obtained data to determine a respective duty cycle of each storage device, and the assessment module 332 is configured to determine a respective likelihood of failure of each storage device using the normalized data.

Figure 4:
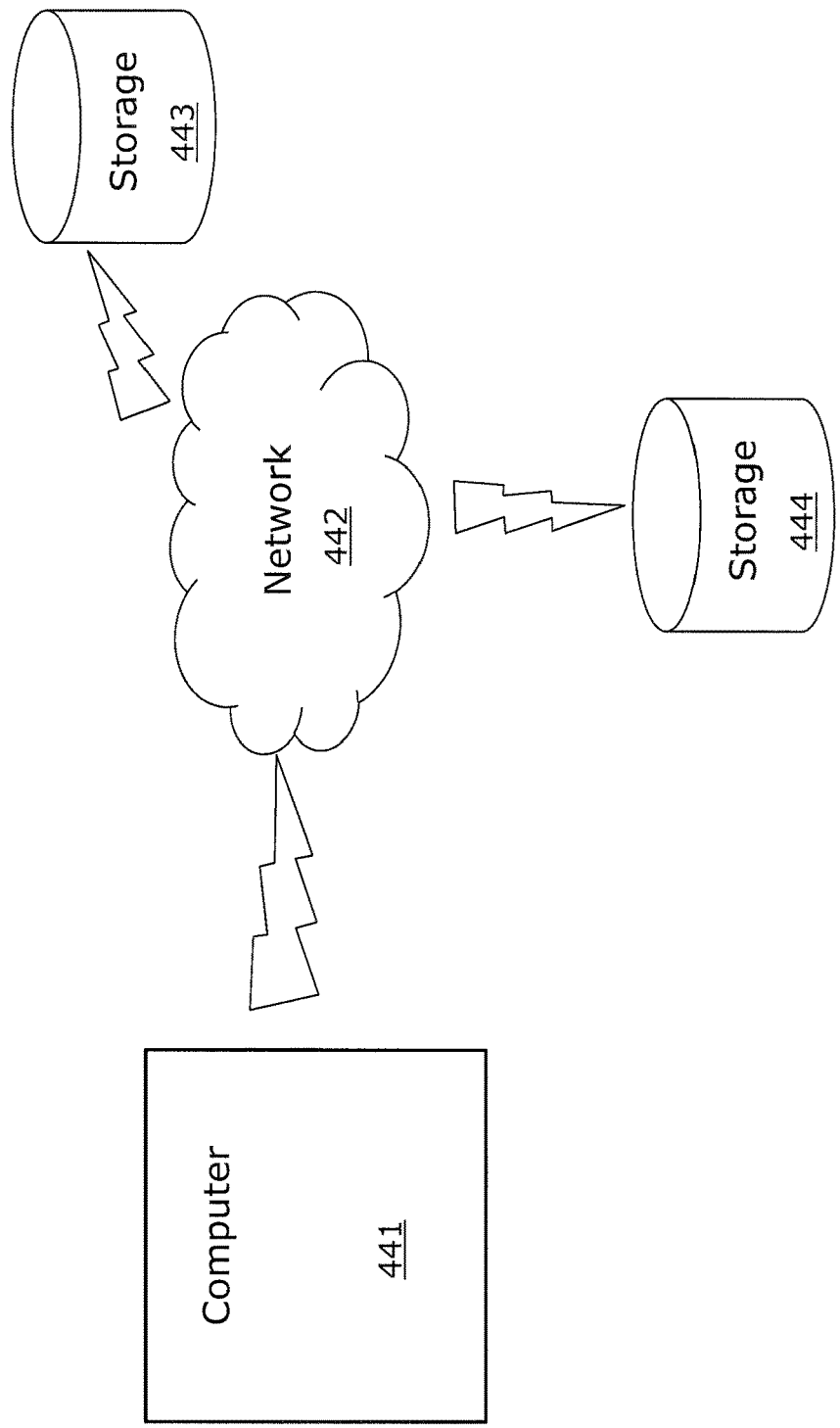
FIG. 4 depicts a computer network environment in which an embodiment of the present invention may be implemented.

FIG. 4 illustrates a computer network environment 440 in which the present invention may be implemented. The computer 441 and the storage devices 443 and 444 are linked through network 442. The computer 441 and the storage devices 443 and 444 may be connected through any network as is known in the art, including a wide area network (WAN) or local area network (LAN). The computer 441 may embody the IHS 320 and/or any embodiment of the IHS described herein. Similarly, the computer 441 may be configured to carry out any method or embodiment thereof described herein. According to an embodiment of the invention, the computer 441 is configured to predict the failure of the storage device 443 and 444. While only two storage devices are depicted, 443 and 444, the computer network environment 440 may comprise any number of storage devices.

FIG. 5 is an example of data 550 that may be used in an embodiment of the present invention. The row 551 of the data 550 is a non-limiting example of the types of data that may comprise the data obtained, for example, in step 101 of the method 100 as described hereinabove in relation to FIG. 1. Further, the row 551 may also comprise pre-established failure data that may be obtained in step 211 of the method 210. Further still, in the data 550, the last column 552, of the data 550 comprises the assessed risk level. In an embodiment of the invention, the assessed risk level 552 may be equated with the likelihood of failure determined in step 103 and/or 104 of the method 100. The column 552 may be populated after completing any embodiment of the invention described herein. For example, after completing step 213 of the method 210, the column 552 may be populated with the result of step 213.

The data 550 may be stored according to any method known in the art. For example, the data 550 may be stored in a database communicatively coupled to a computing device configured to carryout an embodiment of the present invention.

Figure 6:
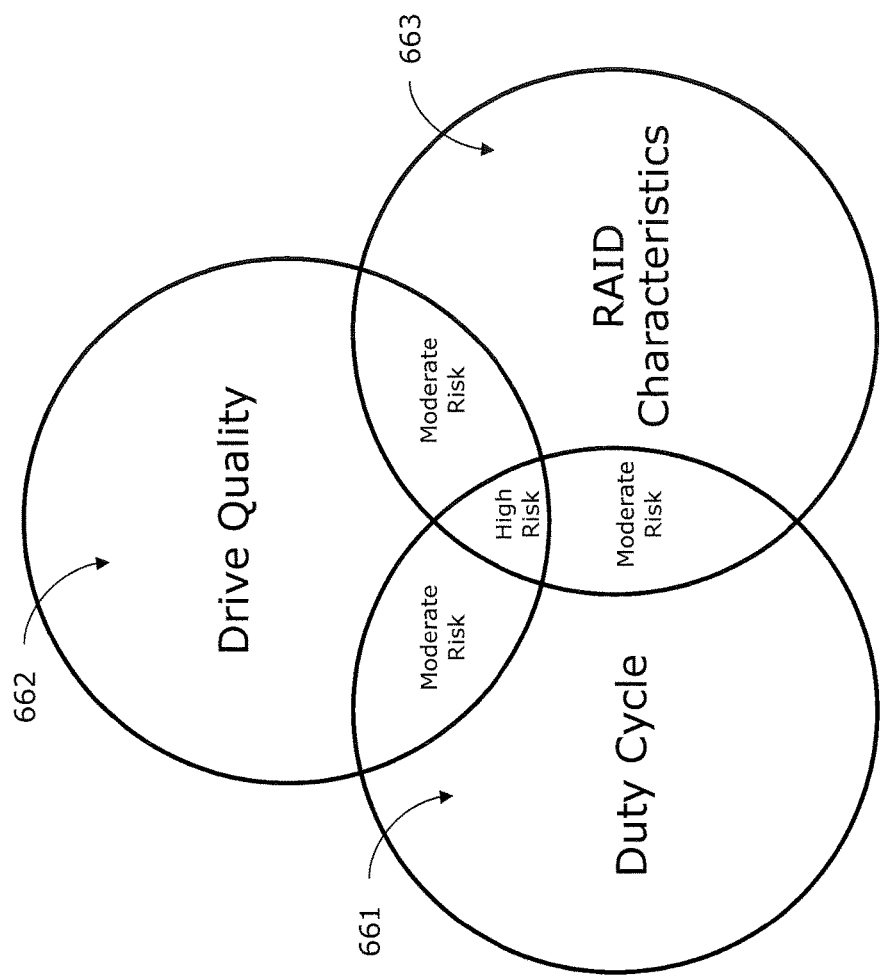
FIG. 6 illustrates categories that an embodiment of the present invention may consider when predicting storage device failures.

FIG. 6 illustrates categories and their relation in a diagram 660 that embodiments of the present invention may consider when predicting storage device failures. Embodiments of the present invention may consider categories including duty cycle 661, drive quality 662, and RAID characteristics 663. Embodiments of the invention may consider any of the categories 661, 662, and/or 663 alone or in combination to predict storage device failures.

As described herein, the duty cycle category 661 relates to the workload of the storage device. When considering duty cycle 661, an embodiment of the present invention may also consider RAID characteristics. For example, if the storage device is a RAID 6 storage device, this information must considered, as described hereinabove, so that the proper duty cycle may be determined.

In addition to being used for determining duty cycle, in an example embodiment of the present invention RAID characteristics 663 may be considered indicative of storage device resiliency. For example, embodiments of the present invention may consider the likelihood of failure high based upon the RAID configuration alone, for example, where the particular RAID configuration cannot recover data in the event of even a single device failure. Further, a storage device may be considered to be in moderate risk as shown in the diagram 660 where both the duty cycle is high and RAID characteristics warrant. In an example embodiment of the present invention, when a storage device has both a high duty cycle, and less than ideal RAID characteristics, for example, when data cannot be recovered in the event of a single device failure, it may be associated with a high or medium-plus failure indicator.

Further, embodiments of the present invention may also consider drive quality 662. Again, as described hereinabove, drive quality may pertain to any drive characteristic as is known in the art, for example, whether the drive is a traditional magnetic storage device or a SSD. According to an example embodiment of the present invention, the drive quality category 662 may be equated with the pre-established failure data described hereinabove.

The diagram 660 also depicts possible relations between the categories 661, 662, and 663. By way of a non-limiting example, an embodiment of the present invention may determine that a storage device is at moderate risk of failure where both the duty cycle is high and the RAID characteristics warrant. Further, as depicted in the diagram 660, a device may be consider to be at moderate risk of failure where duty cycle is high and drive quality is low and/or where drive quality is low and the RAID characteristics are less than ideal. Further still, an example embodiment of the present invention may determine that a storage device is at a high risk of failure where drive quality is low, duty cycle high, and RAID characteristics are less than ideal as depicted in the diagram 660.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

The invention claimed is:

1. A computer implemented method comprising:
for each physical drive of a plurality of physical drives of a logical storage device implemented by the plurality of physical drives in a RAID configuration:
determining a total number of reads and writes to the physical drive as a function of (i) data regarding reads and writes committed by an operating system to the logical storage device and (ii) a number of reads and writes, caused by the RAID configuration, to the physical drive for each read and write committed by the operating system to the logical storage device; and
determining a likelihood of failure for the physical drive based on the determined total number of reads and writes to the physical drive; and
replacing at least one physical drive of the plurality of physical drives based on one or more of the determined likelihoods of failure.

2. The method of claim 1 wherein the data regarding reads and writes committed by the operating system to the logical storage device comprises at least one of:
a number of reads;
a number of writes;
a size of one or more reads; and
a size of one or more writes.

3. The method of claim 1 further comprising:
determining a likelihood of failure of the logical storage device based on the total number of reads and writes determined for each physical drive.

4. The method of claim 3 wherein the likelihood of failure of the logical storage device is further based on device configuration information.

5. The method of claim 4 wherein the device configuration information comprises at least one of:
a number of Redundant Array of Independent Disk (RAID) sets;
a total number of disks;
a number of disks per RAID set; and
a full/partial stripe ratio.

6. The method of claim 1 wherein a higher number of reads and writes indicates increased likelihood of failure.

7. The method of claim 1 further comprising:
for each physical drive, populating a database with an indication of the determined likelihood of failure.

8. The method of claim 7 wherein the indication of the likelihood of failure is a high, medium, or low failure indicator.

9. The method of claim 7 wherein the indication of the likelihood of failure is a high, medium, or low failure indicator, and the method further comprises:
for each physical drive, modifying the indication to be one of high-plus, medium-plus, or low-plus using pre-established failure data that is based upon one or more hardware characteristics of the physical drive.

10. The method of claim 1 further comprising:
modifying the likelihood of failure determined for a given physical drive using pre-established failure data that is based upon one or more hardware characteristics of the given physical drive.

11. The method of claim 10 wherein the pre-established failure data based upon one or more hardware characteristics of the given physical drive comprises at least one of:
storage device size;
storage device speed;
storage device class; and
RAID type.

12. An information handling system (IHS) comprising:
a processor; and
a memory with computer code instructions stored thereon, the processor and the memory, with the computer code instructions being configured to cause the IHS to:
for each physical drive of a plurality of physical drives of a logical storage device implemented by the plurality of physical drives in a RAID configuration:
determine a total number of reads and writes to the physical drive as a function of (i) data regarding reads and writes committed by an operating system to the logical storage device and (ii) a number of reads and writes, caused by the RAID configuration, to the physical drive for each read and write committed by the operating system to the logical storage device; and determine a likelihood of failure for the physical drive based on the determined total number of reads and writes to the physical drive; and replace at least one physical drive of the plurality of physical drives based on one or more of the determined likelihoods of failure.

13. The IHS of claim 12 wherein the data regarding reads and writes committed by the operating system to the logical storage device comprises at least one of:
a number of reads;
a number of writes;
a size of one or more reads; and
a size of one or more writes.

14. The IHS of claim 12 wherein the processor and the memory, with the computer code instructions, are further configured to cause the IHS to:
determine a likelihood of failure of the logical storage device based on the total number of reads and writes determined for each physical drive.

15. The IHS of claim 14 where, in determining the likelihood of failure of the logical storage device, the processor and the memory, with the computer code instructions, are further configured to cause the IHS to:
determine the likelihood of failure of the logical storage device based on device configuration information.

16. The IHS of claim 15 wherein the device configuration information comprises at least one of:
a number of Redundant Array of Independent Disk (RAID) sets;
a total number of disks;
a number of disks per RAID set; and
a full/partial stripe ratio.

17. The IHS of claim 12 wherein a higher number of reads and writes indicates increased likelihood of failure.

18. The IHS of claim 12 wherein the processor and the memory, with the computer code instructions, are further configured to cause the IHS to:
for each physical drive, populate a database with an indication of the determined likelihood of failure.

19. The IHS of claim 12 wherein the processor and the memory, with the computer code instructions, are further configured to cause the IHS to:
modify the likelihood of failure determined for a given physical drive using pre-established failure data that is based upon one or more hardware characteristics of the given physical drive.

20. A non-transitory computer readable medium having stored thereon a sequence of instructions which, when loaded and executed by a processor coupled to an apparatus, causes the apparatus to:
for each physical drive of a plurality of physical drives of a logical storage device implemented by the plurality of physical drives in a RAID configuration:
determine a total number of reads and writes to the physical drive as a function of (i) data regarding reads and writes committed by an operating system to the logical storage device and (ii) a number of reads and writes, caused by the RAID configuration, to the physical drive for each read and write committed by the operating system to the logical storage device; and
determine a likelihood of failure for the physical drive based on the determined total number of reads and writes to the physical drive; and
replace at least one physical drive of the plurality of physical drives based on one or more of the determined likelihoods of failures.

* * * * *

UNITED STATES PATENT AND TRADEMARK OFFICE
CERTIFICATE OF CORRECTION

PATENT NO. : 10,459,815 B2
APPLICATION NO. : 16/252234
DATED : October 29, 2019
INVENTOR(S) : Robert B. Jacoby It is certified that error appears in the above-identified patent and that said Letters Patent is hereby corrected as shown below:

In the Claims

In Column 14, Claim 20, Line 37, delete "failures" and insert -- failure --.

Signed and Sealed this
Tenth Day of December, 2019

Andrei Iancu
*Director of the United States Patent and Trademark Office*